United States Patent
Yee et al.

(10) Patent No.: US 10,014,784 B1
(45) Date of Patent: Jul. 3, 2018

(54) DUAL PRIMARY AND SECONDARY REGULATING METHOD AND CONVERTER UTILIZING THE SAME

(71) Applicant: Sync Power Corp., Taipei (TW)

(72) Inventors: Hsian-Pei Yee, Taipei (TW); Ya-Wu Chung, Taipei (TW); Chun-Jen Huang, Taipei (TW)

(73) Assignee: Sync Power Corp., Taipei (TW)

( * ) Notice: Subject to any disclaimer, the term of this patent is extended or adjusted under 35 U.S.C. 154(b) by 0 days.

(21) Appl. No.: 15/451,424

(22) Filed: Mar. 7, 2017

(51) Int. Cl.
    *H02M 3/335* (2006.01)
    *H02M 1/36* (2007.01)
(52) U.S. Cl.
    CPC .............. *H02M 3/33507* (2013.01)
(58) Field of Classification Search
    CPC .... H02M 1/36; H02M 3/335; H02M 3/33507; H02M 3/33569; H02M 3/33576; H02M 3/33592
    See application file for complete search history.

(56) References Cited

U.S. PATENT DOCUMENTS

| | | | | |
|---|---|---|---|---|
| 8,854,842 | B2 * | 10/2014 | Zheng | H02M 3/33576 363/21.13 |
| 9,318,963 | B2 * | 4/2016 | Yao | H02M 3/33523 |
| 2017/0250612 | A1 * | 8/2017 | Malinin | H02M 3/33507 |

\* cited by examiner

*Primary Examiner* — Gary L Laxton
(74) *Attorney, Agent, or Firm* — CKC & Partners Co., Ltd.

(57) ABSTRACT

A method for modulating a voltage through a primary side regulating circuit and a secondary side regulating circuit, the method includes: providing a first controller in the primary side regulating circuit; providing a second controller in the secondary side regulating circuit; exchanging messages between the first controller and the second controller thereby alternately dominating a modulation of an output voltage between the primary side regulating circuit and the secondary side regulating circuit in accordance with the messages.

12 Claims, 9 Drawing Sheets

DUAL PRIMARY AND SECONDARY REGULATING METHOD AND CONVERTER UTILIZING THE SAME

BACKGROUND

Technical Field

The present disclosure relates to a method for modulating a voltage by alternatively using a primary side regulating (PSR) circuit and a secondary side regulating (SSR) circuit. More particularly, the present disclosure relates to a method for providing a precise modulated voltage.

Description of Related Art

A DC voltage is commonly required for operating an electric device. Therefore, an AC-DC power supply or a DC-DC power supply is needed for outputting a rectified DC voltage. A converter is commonly employed in such AC-DC (or DC-DC) power supply to convert a voltage. Many kinds of circuit topologies such as a forward topology, a flyback topology, a CUK topology, a full bridge topology, a half bridge topology and a push pull topology are used in the converter. The flyback converter is particularly popular in the device requiring only low power owing to its simple structure and low cost. Conventionally, two voltage regulating methods, a primary side regulating method and a secondary side regulating method may be used in such flyback converter.

FIG. 1 is a schematic diagram showing a converter circuit utilizing a conventional secondary side regulating method, and FIG. 2 is a schematic diagram showing a converter circuit utilizing a conventional primary side regulating method. In FIG. 1, the topology of the converter circuit can be divided into a primary side circuit and a secondary side circuit. The primary side circuit has a primary side voltage Vp, an auxiliary voltage Va, a switch and a resistance Rcs. The secondary side circuit has a secondary side voltage Vs. The primary side voltage Vp and the secondary side voltage Vs are in charge of storing and releasing magnetic energy through the coupling of a first winding (indicated as Np) and a second winding (Indicated as Ns). The auxiliary voltage Va is in charge of transmitting messages between the primary side circuit and the secondary side circuit. In other word, the primary side circuit is used to store magnetic energy, and then the magnetic energy is transferred to the secondary side circuit during an operation period in order to modulate a voltage VIN inputted to the primary side circuit and to output a modulated voltage Vo from the secondary side circuit. A main current Ip is received by the primary side circuit, and a magnetically-induced current Is is generated by the coupling between the first winding and the second winding. The magnetically-induced current Is is used to charge the load capacitor Co through the diode D2. The auxiliary voltage Va is used to provide electric power to a controller disposed in the primary side circuit. Initially, a capacitor C1 is charged through a resistance R1 to provide required electric power. In FIG. 1, in order to transmit messages from the secondary side circuit to the primary side circuit, a photocoupler Pc is used to feedback a signal to a feedback terminal vfb of the controller disposed in the primary side circuit.

In FIG. 2, the primary side regulating method is shown. It is shown that the circuit topology is dramatically simplified in the secondary side circuit for clarity, and no photocoupler Pc is used. In this scenario, the messages are transmitted from the secondary side circuit to the primary side circuit by the coupling between the secondary side voltage Vs and the auxiliary voltage Va, and a signal is feedback to a feedback terminal vfb of a controller disposed in the primary side circuit.

In the converter circuit utilizing the secondary side regulating method of FIG. 1, a precise output voltage Vo can be obtained. However, its circuit topology is very complicated and the high-priced photocoupler Pc and a regulator IC (TL 431) are required, and thus it is costly to use the method of FIG. 1. In the primary side regulating method of FIG. 2, a lower cost converter circuit can be achieved because the circuit topology of the secondary side circuit is dramatically simplified, but the output voltage Vo cannot be precisely controlled in this scenario. FIG. 3 is a schematic diagram showing an operation state of the converter circuit of FIG. 2. In FIG. 3, the waveform of the auxiliary voltage Va shows an error $M_{err}$. Furthermore, the voltage difference caused by the current passing through the diode D2 in FIG. 2 would introduce different sampling points s1, s2, and s3. At the sampling point s1, the output voltage Vo will be higher than its real value, and at the sampling point s3, the output voltage Vo will be lower than its real value. It is apparent that the sampling point s2 is a proper sampling point. An inaccuracy value of the output voltage Vo of the converter circuit of FIG. 2 are also shown in FIG. 3. The period of time from T2-T0 is an interval that the primary side circuit is operated in accordance with the messages transmitted from the secondary side circuit. In the conventional primary side regulating method of FIGS. 2 and 3, if a variance of the output voltage Vo occurs in the secondary side circuit, the primary side circuit cannot be notified instantly because the variance only can be detected by the primary side circuit in the next operation period. Therefore, in the converter circuit utilizing the primary side regulating method of FIG. 2, the response speed is low, thus resulting in an inaccurate output voltage Vo.

Accordingly, it is needed to develop a method that is capable of precisely controlling the output voltage Vo.

SUMMARY

According to one aspect of the present disclosure, a method for modulating a voltage through a primary side regulating circuit and a secondary side regulating circuit is provided. The method includes providing a first controller in the primary side regulating circuit; providing a second controller in the secondary side regulating circuit; and exchanging messages between the first controller and the second controller, thereby alternately dominating a modulation of an output voltage between the primary side regulating circuit and the secondary side regulating circuit in accordance with the messages.

According to another aspect of the present disclosure, a method for modulating a voltage through a primary side regulating circuit and a secondary side regulating circuit is provided. The method includes: activating the primary side regulating circuit for generating an output voltage; increasing the output voltage to a pre-determined primary side modulation voltage through the primary side regulating circuit; activating the secondary side regulating circuit when the output voltage is greater than a threshold voltage level; turning on and then turning off a second switch of the secondary side regulating circuit to feedback a message to the primary side regulating circuit; turning on and then turning off a first switch of the primary side regulating circuit by the primary side regulating circuit to transmit energy to the secondary side regulating circuit after the message is received; and increasing the output voltage to a pre-determined secondary side modulation voltage through the secondary regulating circuit.

According to another aspect of the present disclosure, a converter for modulating a voltage is provided. The converter includes a primary side circuit and a secondary side circuit. The primary side circuit includes a first controller and a first switch. The first switch is controlled by the first controller. The secondary side circuit is coupled to the primary side circuit and includes a second controller and a second switch. The second switch is controlled by the second controller. The second controller controls the second switch to be turned on and turned off to feedback a message to the primary side circuit; and the first controller controls the first switch to be turned on and turned off to transfer energy to the secondary side circuit if the first controller receives the message.

BRIEF DESCRIPTION OF THE DRAWINGS

The present disclosure can be more fully understood by reading the following detailed description of the embodiment, with reference made to the accompanying drawings as follows.

DETAILED DESCRIPTION

An object of the present disclosure to provide a method for precisely controlling an output voltage in a converter. More specifically, in the method of the present disclosure, two independent controllers (a first controller and a second controller) are used in a primary side circuit and a secondary side circuit respectively, such that the secondary side circuit can transmit message to the primary side circuit instantly through the second controller disposed in the secondary side circuit, thereby increasing the respond speed and obtaining an accurate output voltage.

Figure 1:
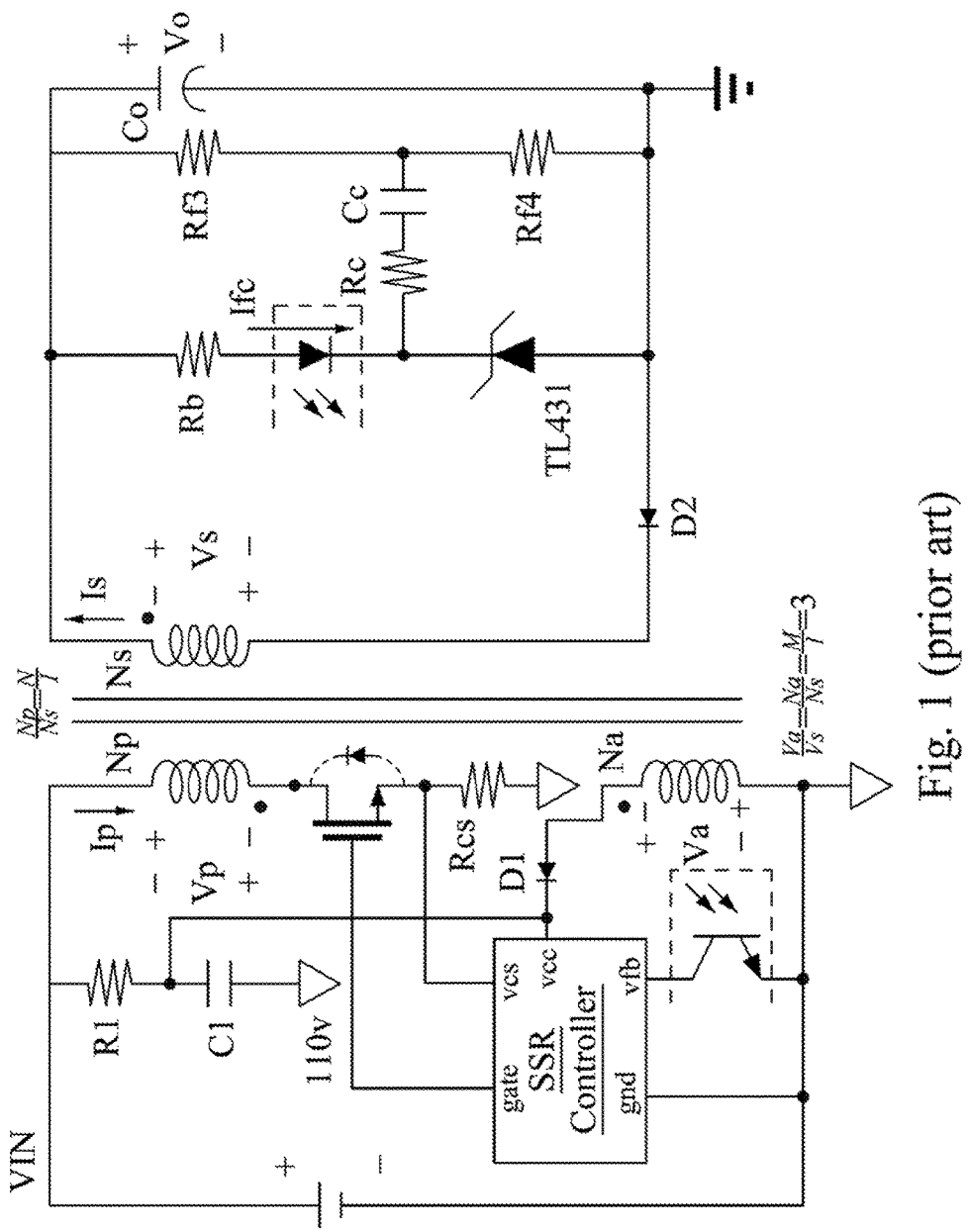
FIG. 1 is a schematic diagram showing a converter circuit utilizing a conventional secondary side regulating method.
Figure 2:
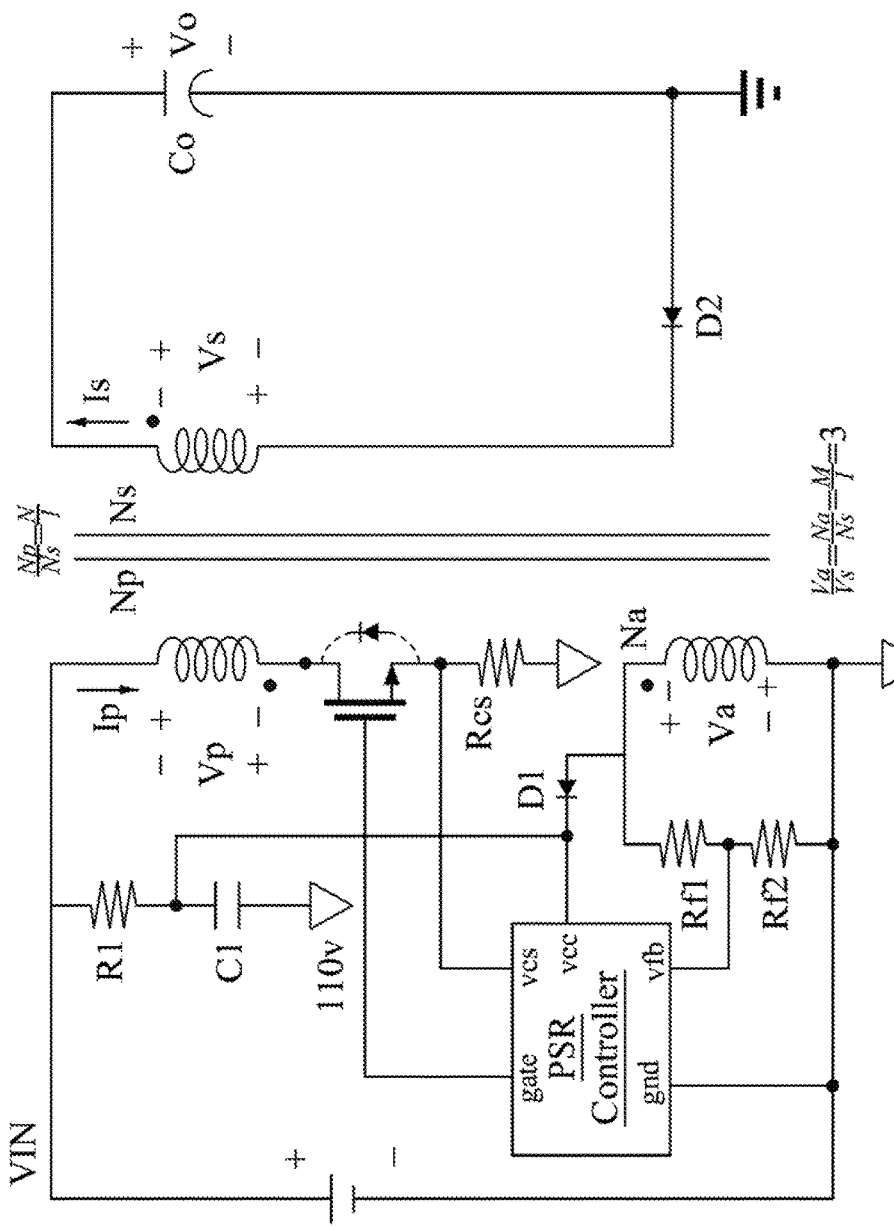
FIG. 2 is a schematic diagram showing a converter circuit utilizing a conventional primary side regulating method.
Figure 3:
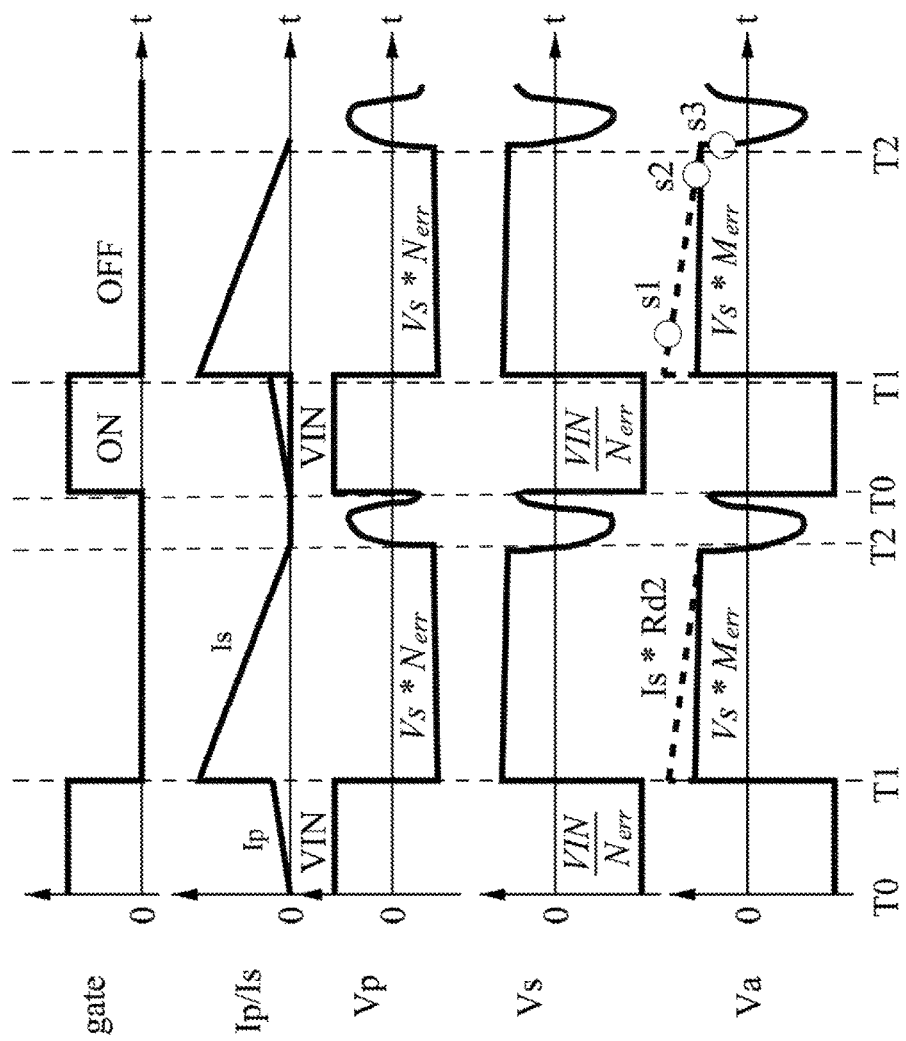
FIG. 3 is a schematic diagram showing an operation status of the converter circuit of FIG. 2.
Figure 4:
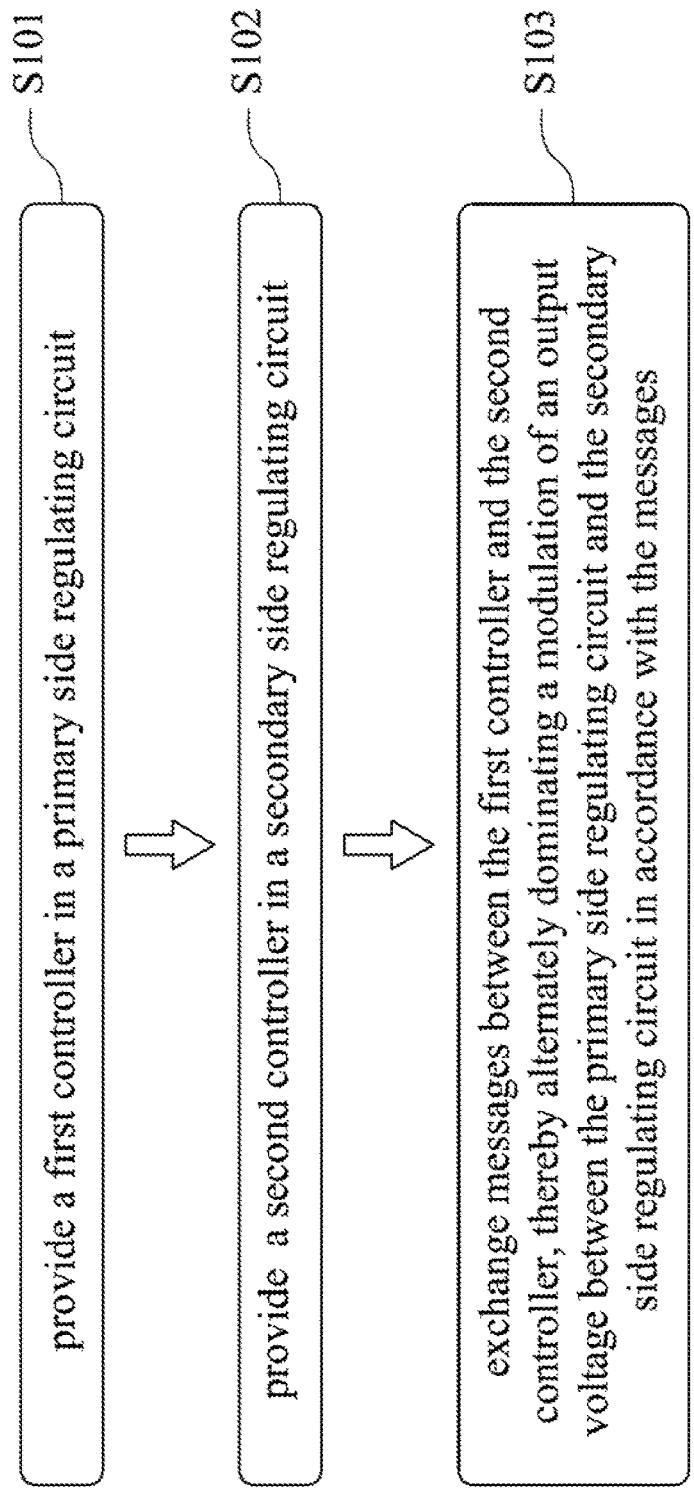
FIG. 4 is a flow chart showing a method for modulating a voltage through dual primary side and secondary side regulating circuit according to one embodiment of the present disclosure.

FIG. 4 is a flow chart showing a method for modulating a voltage through dual primary side and secondary side regulating circuit according to one embodiment of the present disclosure. The method includes the following steps.

A step S101 is performed for providing a first controller in a primary side regulating circuit.

A step S102 is performed for providing a second controller in a secondary side regulating circuit.

A step S103 is performed for exchanging messages between the first controller and the second controller, thereby alternately dominating a modulation of an output voltage between the primary side regulating circuit and the secondary side regulating circuit in accordance with the messages.

In the aforementioned method, the primary side regulating circuit dominates the modulation of the output voltage in an initial state, and the secondary side regulating circuit dominates the modulation of the output voltage in a steady state. Furthermore, the primary side regulating circuit transmits energy to the secondary side regulating circuit when the secondary controlling circuit requires the energy. The wording "dual" indicates that two independent controllers (i.e., the first controller and the second controller) are used in the primary side regulating circuit and the secondary side regulating circuit respectively. Therefore, the primary side regulating circuit and the secondary side regulating circuit can transmit messages between each other actively, and the response speed can be increased.

Figure 5:
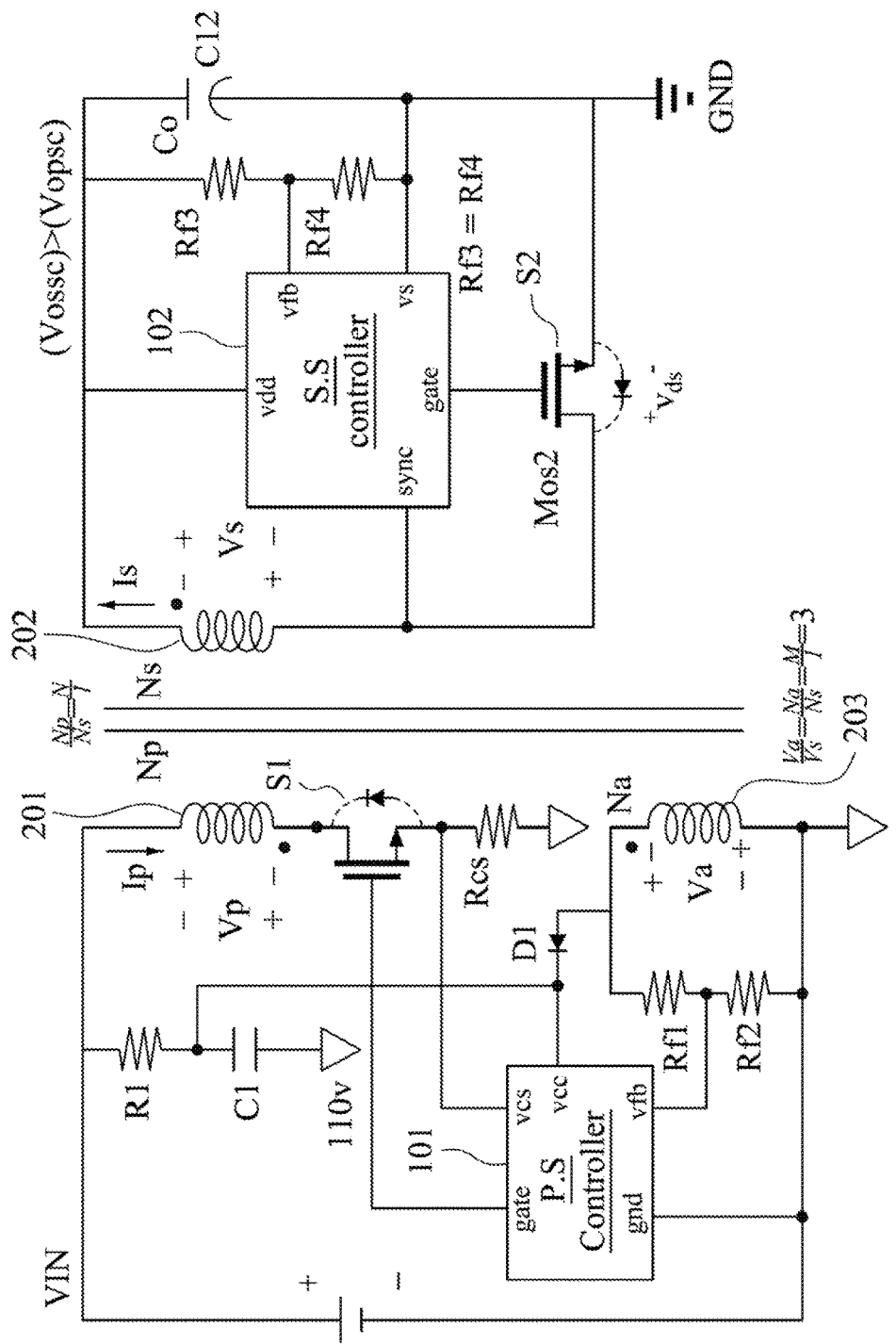
FIG. 5 is a schematic diagram showing a converter for modulating a voltage through dual primary side and secondary side regulating circuit according to one embodiment of the present disclosure.

FIG. 5 is a schematic diagram showing a converter for modulating a voltage through dual primary side and secondary side regulating circuits according to one embodiment of the present disclosure.

In FIG. 5, a converter includes a primary side circuit and a secondary side circuit. The primary side circuit includes a first controller 101 and a first switch S1 controlled by the first controller 101. The secondary circuit includes a second controller 102 and a second switch S2 controlled by the second controller 102.

The second controller 102 controls the second switch S2 to be turned on/off to feedback a message to the primary side circuit; and the first controller 101 controls the first switch S1 to be turned on/off to transfer energy to the secondary side circuit if the first controller 101 receives the message. In one example, the first switch S1 or the second switch S2 may be a MOSFET, and when the first switch S1 is turned on, the second switch S2 should be turned off to prevent the damage of the MOSFET.

The primary side circuit includes a first winding 201 and an auxiliary winging 203. The first winding 201 is coupled with the first switch S1 and the first controller 101. The auxiliary winding 203 is coupled with the first controller 101.

The secondary side circuit includes a second winding 202. The second winding 202 is coupled with the second switch S2.

The first winding 201 of the primary side circuit is coupled with the second winding 202 of the secondary side circuit to transfer energy from the primary side circuit to the secondary side circuit.

The message is transferred from the primary side circuit to the secondary side circuit through the coupling between the second winding 202 and the auxiliary winding 203.

Figure 6:
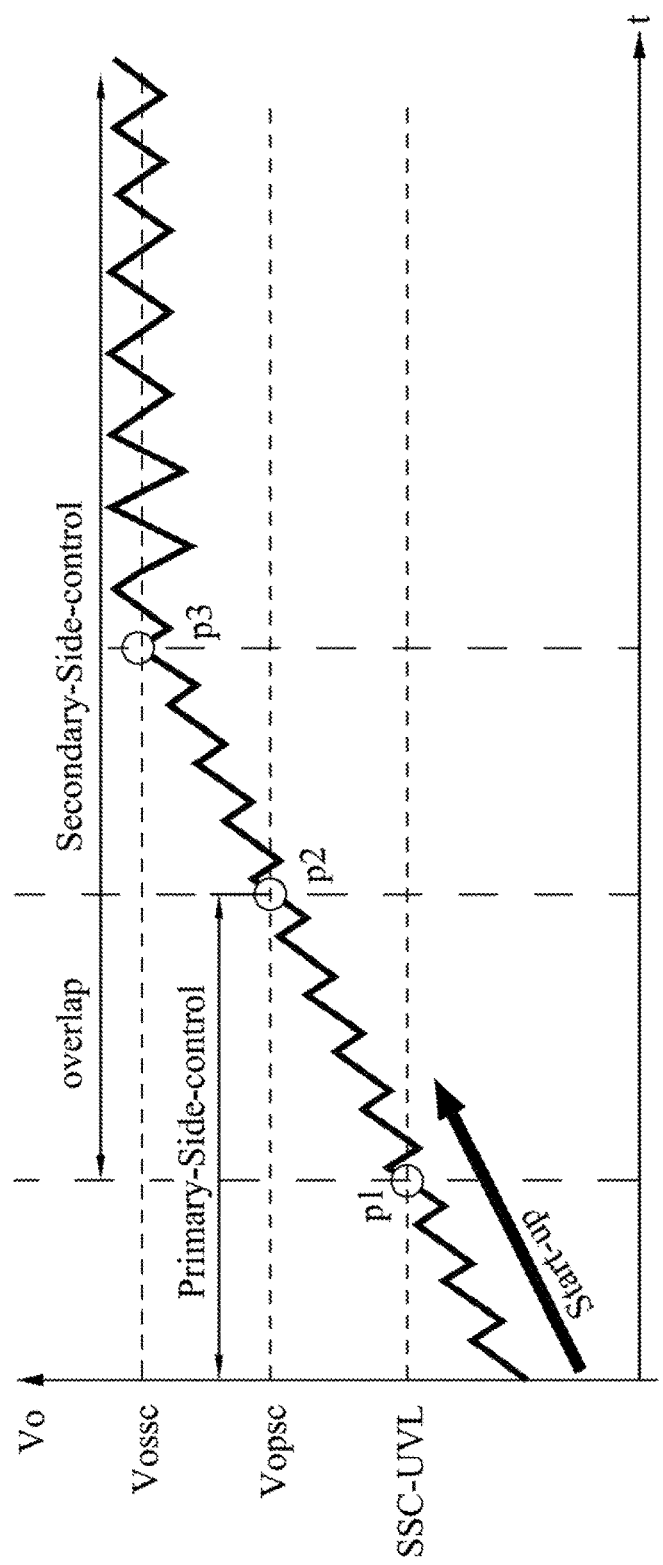
FIG. 6 is a schematic diagram showing an operation status of the converter of FIG. 5.

FIG. 6 is a schematic diagram showing operation procedures of the converter of FIG. 5. The procedures include the following steps.

(a) The output voltage Vo is increased to a pre-determined primary side modulation voltage Vopsc through the primary side regulating circuit.

(b) The secondary side regulating circuit is activated when the output voltage is greater than a threshold voltage level SSC-UVL.

(c) The second switch S2 of the secondary side regulating circuit is turned on and then turned off to feedback a message to inform the primary side regulating circuit.

(d) The first switch S1 of the primary side regulating circuit is turned on and then turned off by the primary side regulating circuit to transmit energy to the secondary side regulating circuit after receiving the message.

(e) The output voltage Vo is increased to a pre-determined secondary side modulation voltage Vossc through the secondary regulating circuit.

Figure 7:
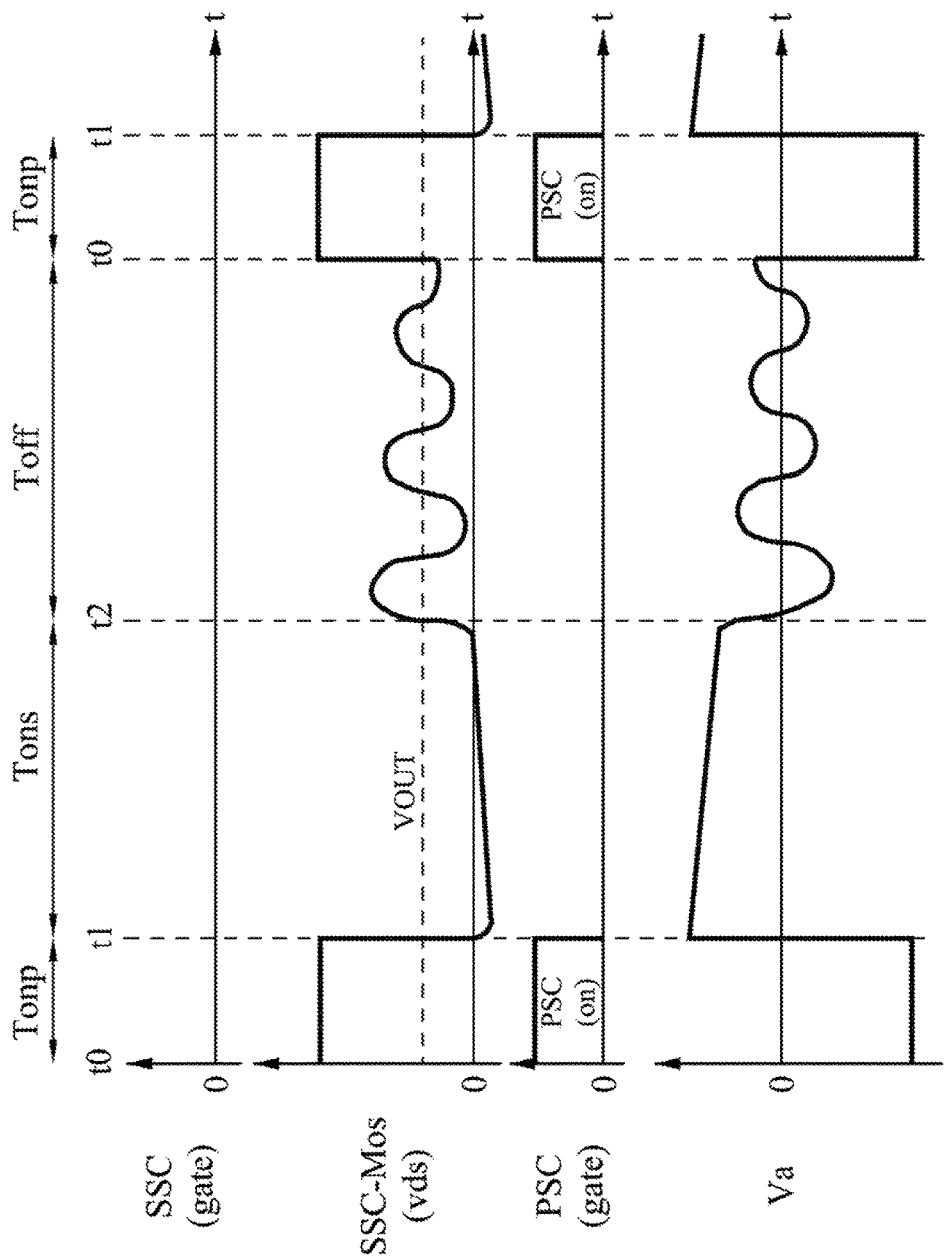
FIG. 7 is a waveform diagram showing that the primary side regulating circuit dominates the modulation of the output voltage.

In FIG. 6, initially, the pre-determined secondary side modulation voltage Vossc is greater than the pre-determined primary side modulation voltage Vopsc; the first controller 101 and the second controller 102 are not in operation, and the primary side regulating circuit is activated through a charging procedure (i.e., in FIG. 5, when the input voltage VIN is received in the primary side circuit, the capacitor C1 is charged through the resistance R1 to provide the required electric power to activate the primary side circuit). Then, the output voltage Vo is increased to the pre-determined primary side modulation voltage Vopsc. Meanwhile, the primary side regulation circuit dominates the modulation of the output voltage Vo, and the secondary side regulating circuit is not in operation, as shown in FIG. 7. When the output voltage Vo is greater than the threshold voltage level SSC-UVL, the secondary side regulating circuit starts to operate and dominate the modulation of the output voltage Vo. At this moment, the primary side regulating circuit is passive, and the secondary side regulating circuit is active. The secondary side regulating circuit turns on then turns off the second switch S2 to transmit the message to the primary side regulating circuit, and the primary side regulating circuit turns on then turns off the first switch S1 to transmit energy to the secondary side regulating circuit after receiving the message. And then, the output voltage Vo can be increased to the pre-determined secondary side modulation voltage Vossc after receiving the energy.

More specifically, the energy is transmitted from the primary side regulating circuit to the secondary side regulating circuit through a coupling of the first winding 201 and the second winding 202. The message is fed back to the primary side regulating circuit through the coupling between the second winding 202 and the auxiliary winding 203. The first switch S1 is coupled to a control terminal gate of the first controller 101, and the second switch S2 is coupled to a control terminal gate of the second controller 102.

Figure 8:
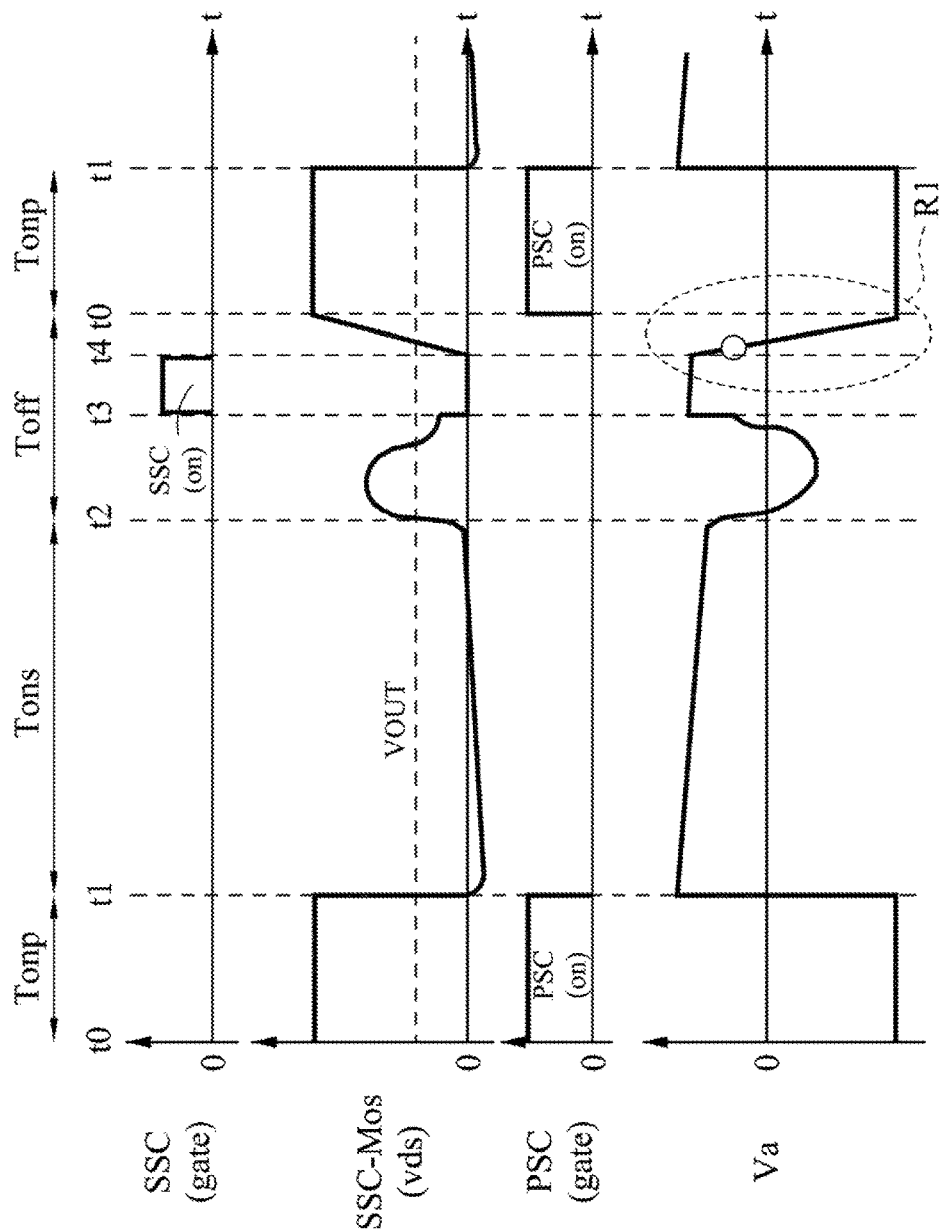
FIG. 8 is a waveform diagram showing that the converter of FIG. 5 operated in a discontinuous current mode (DCM)

FIG. 8 is a waveform diagram showing that the converter of FIG. 5 operated in a DCM (Discontinuous Current Mode) mode. When the converter is operated in the DCM, the second switch S2 is turned on and then turned off by the second controller 102 to notify the primary side regulating circuit to provide energy, and a voltage level with a steep slope (shown in region R1 of the waveform of the auxiliary voltage Va) is detected by the auxiliary winding 203, and then the first switch S1 is turned on by the first controller 101 for storing energy, and then the energy is transmitted to the secondary side regulating circuit by the primary side regulating circuit after the first switch S1 is turned off by the first controller 101.

Figure 9:
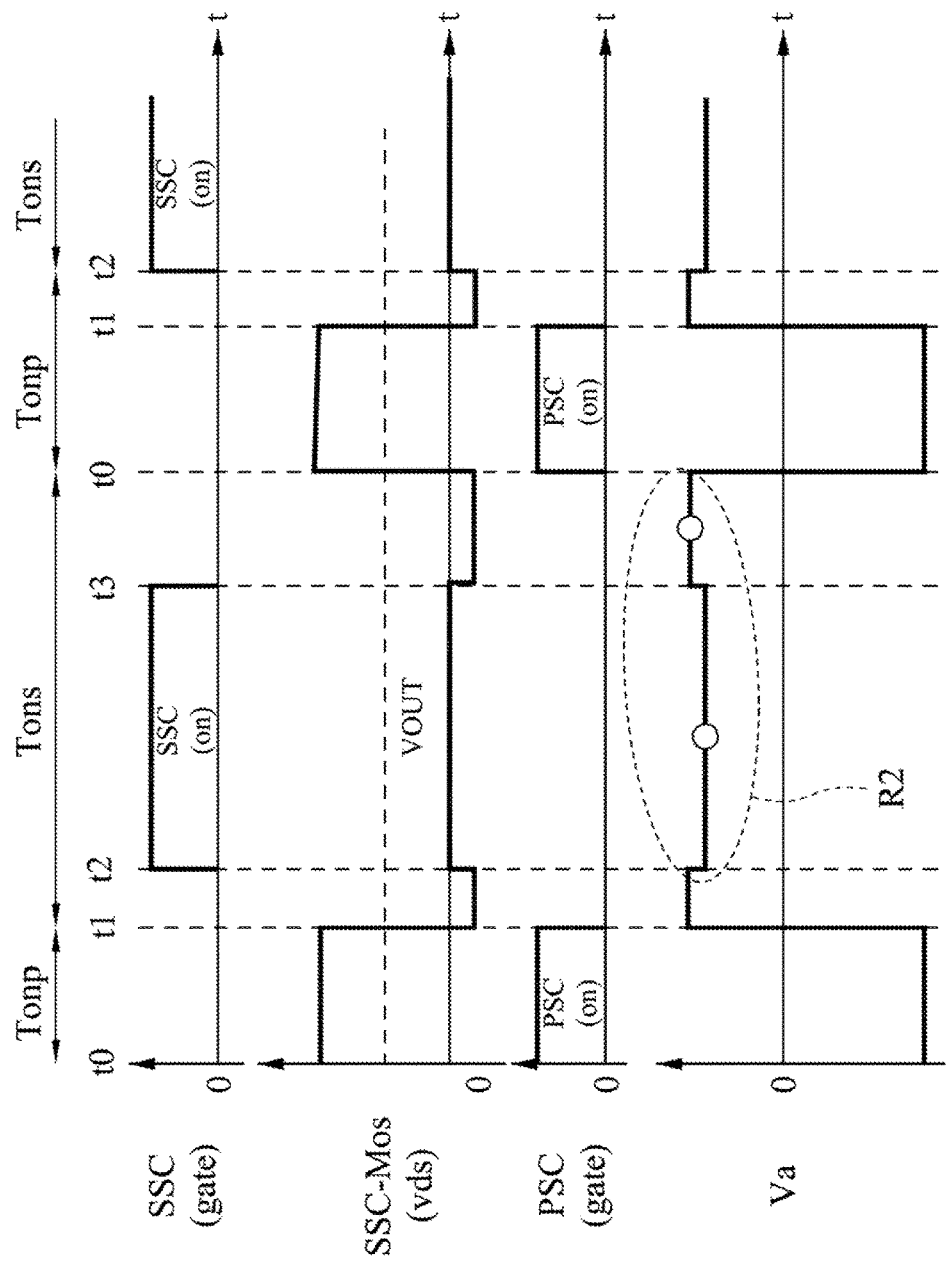
FIG. 9 is a waveform diagram showing that the converter of FIG. 5 operated in a continuous current mode (CCM).

FIG. 9 is a waveform diagram showing that the converter of FIG. 5 operated in a CCM (Continuous Current Mode) mode. When the converter is operated in the CCM, the second switch S2 is turned on and then turned off by the second controller 102 to notify the primary side regulating circuit to provide energy, and a voltage level peak (shown in the region R2 of the waveform of the auxiliary voltage Va) is detected by the auxiliary winding 203 and then the first switch S1 is turned on by the first controller 101 for storing energy, and then the energy is transmitted to the secondary side regulating circuit by the primary side regulating circuit after the first switch S1 is turned off by the first controller 101.

In summary, the present disclosure provides a method and a converter that can obtain accurate output voltage through disposing two independent controllers in the primary side regulation circuit and the secondary side regulating circuit respectively. The response speed of transmitting message between the primary side regulating circuit and the secondary side regulating circuit can be increased by the turning on/off the second switch S2 controlled by the second controller 101. Thus, the output voltage Vo can be modulated precisely.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for modulating a voltage through a primary side regulating circuit and a secondary side regulating circuit, the method comprising:
   providing a first controller in the primary side regulating circuit;
   providing a second controller in the secondary side regulating circuit; and
   exchanging messages between the first controller and the second controller, thereby alternately dominating a modulation of an output voltage between the primary side regulating circuit and the secondary side regulating circuit in accordance with the messages.

2. The method of claim 1, wherein the primary side regulating circuit dominates the modulation of the output voltage in an initial state, and the secondary side regulating circuit dominates the modulation of the output voltage in a steady state.

3. The method of claim 1, wherein the primary side regulating circuit transmits energy to the secondary side regulating circuit when the secondary controlling circuit requires the energy.

4. A method for modulating a voltage through a primary side regulating circuit and a secondary side regulating circuit, the method comprising:
   activating the primary side regulating circuit to generate an output voltage;
   increasing the output voltage to a pre-determined primary side modulation voltage through the primary side regulating circuit;
   activating the secondary side regulating circuit when the output voltage is greater than a threshold voltage level;
   turning on and then turning off a second switch of the secondary side regulating circuit to feedback a message to the primary side regulating circuit;
   turning on and then turning off a first switch of the primary side regulating circuit by the primary side regulating circuit to transmit energy to the secondary side regulating circuit after the message is received; and increasing the output voltage to a pre-determined secondary side modulation voltage through the secondary regulating circuit.

5. The method of claim 4, wherein the primary side regulating circuit is activated through a charging procedure.

6. The method of claim 4, wherein the energy is transmitted from the primary side regulating circuit to the secondary side regulating circuit through a coupling of a first winding disposed in the primary side regulating circuit and a second winding disposed in the secondary side regulating circuit.

7. The method of claim 4, wherein the message is feedback to the primary side regulating circuit through an auxiliary winding disposed in the primary side regulating circuit.

8. The method of claim 7, wherein the first switch is controlled by a first controller in the primary side regulating circuit and the second switch is controlled by a second controller in the secondary side regulating circuit.

9. The method of claim 8, wherein when operated in a discontinuous current mode (DCM), the second switch is turned on then turned off by the second controller to inform the primary side regulating circuit to provide energy, a voltage level with a steep slope is detected by the auxiliary winding, then the first switch is turned on by the first controller for storing energy, and then the energy is transmitted to the secondary side regulating circuit by the primary side regulating circuit after the first switch is turned off by the first controller.

10. The method of claim 8, wherein when being operated in a continuous current mode (CCM), the second switch is turned on and then turned off by the second controller to notify the primary side regulating circuit to provide energy; and a voltage level peak is detected by the auxiliary winding and then the first switch is opened by the first controller for storing energy, and then the energy is transmitted to the secondary side regulating circuit by the primary side regulating circuit after the first switch is turned off by the first controller.

11. The method of claim 4, wherein the pre-determined secondary side modulation voltage is greater than the pre-determined primary side modulation voltage.

12. A converter for modulating a voltage, the converter comprising:
   a primary side circuit, comprising:
      a first controller;
      a first switch controlled by the first controller;
      a first winding coupled with the first switch and the first controller; and
      an auxiliary winding coupled with the first controller:
   a secondary side circuit coupled to the primary side circuit, the secondary side circuit comprising:
      a second controller;
      a second switch controlled by the second controller; and
      a second winding coupled with the second switch;
   wherein the second controller controls the second switch to be turned on and turned off, so as to feed back a message to the primary side circuit; and the first controller controls the first switch to be turned on and turned off so as to transfer energy to the secondary side circuit if the first controller receives the message;
   wherein the first winding of the primary side circuit is coupled with the second winding of the secondary side circuit to transfer the energy from the primary side circuit to the secondary side circuit, and the message is transferred form the primary side circuit to the secondary side circuit through the auxiliary winding.

\* \* \* \* \*